United States Patent
Rock (10) Patent No.: US 10,964,956 B2
(45) Date of Patent: Mar. 30, 2021

(54) FUEL CELL STACK ASSEMBLY

(71) Applicant: GM GLOBAL TECHNOLOGY OPERATIONS LLC, Detroit, MI (US)

(72) Inventor: Jeffrey A. Rock, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 57 days.

(21) Appl. No.: 16/001,400

(22) Filed: Jun. 6, 2018

(65) Prior Publication Data

US 2019/0379065 A1 Dec. 12, 2019

(51) Int. Cl.
| | |
|---|---|
| *H01M 8/0258* | (2016.01) |
| *H01M 8/0267* | (2016.01) |
| *H01M 8/1004* | (2016.01) |
| *H01M 8/0273* | (2016.01) |

(52) U.S. Cl.
CPC ....... *H01M 8/0258* (2013.01); *H01M 8/0267* (2013.01); *H01M 8/0273* (2013.01); *H01M 8/1004* (2013.01)

(58) Field of Classification Search
CPC ............. H01M 8/0258; H01M 8/0267; H01M 8/2483; H01M 8/0273; H01M 8/0271; H01M 8/0297; H01M 8/1004; H01M 8/0202–0258
See application file for complete search history.

(56) References Cited

U.S. PATENT DOCUMENTS

| | | | |
|---|---|---|---|
| 5,776,624 A | 7/1998 | Neutzler | |
| 5,804,326 A | 9/1998 | Chow et al. | |
| 5,981,098 A | 11/1999 | Vitale | |
| 6,503,653 B2 | 1/2003 | Rock | |
| 6,974,648 B2 | 12/2005 | Goebel | |
| 7,270,909 B2 | 9/2007 | Beutel et al. | |
| 7,687,182 B2 | 3/2010 | Goebel et al. | |
| 8,372,556 B2 | 2/2013 | Goebel | |
| 8,802,326 B2 | 8/2014 | Spencer et al. | |
| 2004/0137309 A1* | 7/2004 | Allen | H01M 8/0228 429/514 |
| 2006/0051654 A1 | 3/2006 | Beutel et al. | |
| 2008/0107944 A1 | 5/2008 | Goebel | |
| 2009/0263702 A1* | 10/2009 | Vyas | H01M 8/0273 429/480 |
| 2018/0048012 A1 | 2/2018 | Beutel et al. | |

* cited by examiner

*Primary Examiner* — Stephen J Yanchuk
*Assistant Examiner* — Kirsten B Tysl
(74) *Attorney, Agent, or Firm* — Quinn IP Law (57) ABSTRACT

A fuel cell stack assembly includes first and second bipolar plates, an active area membrane, and an optional subgasket. The first bipolar plate defines a first plurality of tunnels and the second bipolar plate defines a second plurality of tunnels. The second plurality of tunnels may be engaged with and nested between the first plurality of tunnels. The active area membrane may be disposed within an internal periphery of a subgasket between the first and second bipolar plates wherein the subgasket may, optionally, be positioned between the first and second plurality of tunnels.

16 Claims, 6 Drawing Sheets

Prior Art

FUEL CELL STACK ASSEMBLY

TECHNICAL FIELD

This present disclosure relates generally to PEM fuel cells and more particularly to bipolar plates for separating adjacent fuel cells in a fuel cell stack.

BACKGROUND

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which (1) pass electrons from the anode of one fuel cell to the cathode of the adjacent cell of a fuel cell stack, (2) contain appropriate channels and/or openings formed therein for distributing the fuel cell's gaseous reactants over the surfaces of the respective anode and cathode catalysts; and (3) contain appropriate channels and/or openings formed therein for distributing appropriate coolant throughout the fuel cell stack in order to maintain temperature.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. A group of adjacent cells within the stack is referred to as a cluster. By way of example, some typical arrangements for multiple cells in a stack are shown and described in U.S. Pat. No. 5,663,113. In PEM fuel cells, hydrogen ($H_2$) is the anode reactant (i.e., fuel) and oxygen is the cathode reactant (i.e., oxidant). The oxygen can be either a pure form ($O_2$) or air (a mixture of $O_2$ and $N_2$).

The electrically conductive plates sandwiching the MEAs may contain an array of grooves in the faces thereof that define a reactant flow field in the active area region for distributing the fuel cell's gaseous reactants (i.e., hydrogen and oxygen in the form of air) over the surfaces of the respective cathode and anode. Tunnels are also defined in the region between the manifold inlets/outlets and the active area region. Coolant tunnels are provided to route coolant fluid between the coolant inlet/outlet and the flow field in the active area region. Reactant tunnels are provided to route each reactant from the particular reactant inlet to the flow field and to also route each reactant from the flow field to the particular reactant outlet. These tunnels are generally a plurality of flow channels through which the gaseous reactants and/or coolant flow from a supply header at one end of the flow channels to an exhaust header at the opposite end of the flow channels. The reactant flow field is a predetermined flow field pattern defined in each of the anode half and the cathode half of the adjacent bipolar plates which are directly adjacent to a face of the gas diffusion layer in order to encourage a reaction therebetween.

In a fuel cell stack, multiple fuel cells are stacked together in electrical series while being separated by gas impermeable, electrically conductive bipolar plates. In some instances, the bipolar plate is an assembly formed by securing a pair of thin metal sheets (in the form of an anode half and a cathode half) wherein each sheet/half defines reactant flow fields formed on their external face surfaces. When the thin metal sheets (anode half and cathode half) are joined together, tunnels for the coolant and reactant fluids are defined between the thin metal sheets. Typically, an internal coolant flow field is provided between the metal plates of each bipolar plate in the fuel cell stack. It is also known to locate a spacer plate between the metal plates to optimize the heat transfer characteristics for improved fuel cell cooling.

Typically, the cooling system associated with a fuel cell stack includes a circulation pump for circulating a liquid coolant through the fuel cell stack to a heat exchanger where the waste thermal energy (i.e., heat) is transferred to the environment. The thermal properties of typical liquid coolants require that a relatively large volume be circulated through the system to reject sufficient waste energy in order to maintain the temperature of the stack within an acceptable range, particularly under maximum power conditions.

A common type of fuel cell is known as a proton exchange membrane (PEM) fuel cell. The PEM fuel cell includes a unitized electrode assembly (UEA) disposed between a pair of fuel cell plates such as bipolar plates, for example. The UEA may include diffusion mediums (also known as a gas diffusion layer) disposed adjacent to an anode face and a cathode face of a membrane electrolyte assembly (MEA). The MEA includes a thin proton-conductive, polymeric, membrane-electrolyte having an anode electrode film formed on one face thereof, and a cathode electrode film formed on the opposite face thereof. In general, such membrane-electrolytes are made from ion-exchange resins, and typically comprise a perfluoronated sulfonic acid polymer such as NAFION™ available from the E.I. DuPont de Nemeours & Co. The anode and cathode films, on the other hand, typically comprise (1) finely divided carbon particles, very finely divided catalytic particles supported on the internal and external surfaces of the carbon particles, and proton conductive material (e.g., NAFION™) intermingled with the catalytic and carbon particles, or (2) catalytic particles, sans carbon, dispersed throughout a polytetrafluoroethylene (PTFE) binder.

As indicated, the MEA may be sandwiched between sheets of porous, gas-permeable, conductive material ("gas diffusion layer") in which a gas diffusion layer presses against each of the anode and cathode faces of the MEA. Suitable such primary current collector sheets or gas diffusion mediums may comprise carbon or graphite paper or cloth, fine mesh noble metal screen, and the like, as is well known in the art.

The formed-sandwich is pressed between a pair of electrically conductive plates (hereinafter referred to as "bipolar plates") which serve as secondary current collectors for collecting the current from the primary current collectors and conducting current between adjacent cells (i.e., in the case of bipolar plates) internally of the stack, and externally of the stack in the case of monopolar plates at the ends of the stack. As previously indicated, the bipolar plates each define dedicated tunnels for the coolant fluid and for each reactant fluid in addition to at least one so-called "flow field" which distributes the fuel cell's gaseous reactants (e.g., $H_2$ and $O_2$/air) over the surfaces of the anode and cathode. Tunnels 118, 118', 168, 168' route each of the reactant fluids and the coolant fluid from each corresponding manifold inlet to the flow field. Serpentine flow channels may, but not necessarily, be used in the flow field wherein a number of hairpin turns and switch backs may be defined such that each leg of the serpentine flow channel borders at least one other leg of the same serpentine flow channel.

Figure 1:
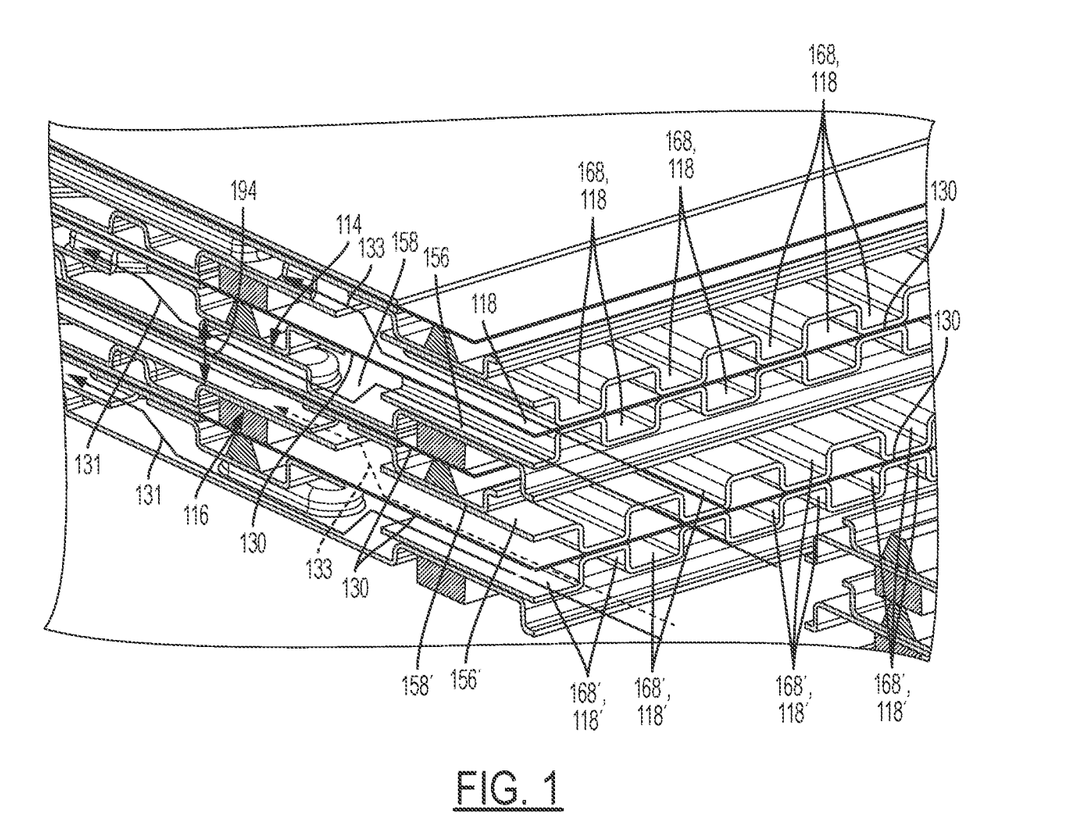
FIG. 1 illustrates a partial view of a prior art fuel cell stack.

Similarly, proximate to the manifold apertures which function as outlets, the tunnels are configured to route each of the reactant product fluids and the coolant fluid from the flow field to the manifold apertures which function as outlets. With reference to FIG. 1, it is understood that the tunnels 118 may be tunnels dedicated to one of two specific reactant inlets (if tunnels 118 are disposed between a reactant inlet/outlet and the flow field)—such that tunnels 118 route a reactant fluid to/from a reactant inlet to the flow field. Similarly, coolant tunnels 168 may be provided in a region (in lieu of reactant tunnels) when the tunnels 168 are disposed between a coolant inlet and the flow field—such that the tunnels 168 route a coolant fluid to/from an outlet/inlet of the coolant to the flow field. However, regardless of whether the tunnels are coolant tunnels 168 or reactant tunnels 118, it is understood that the tunnels 118, 118', 168, 168' (shown in FIG. 1) are traditionally stacked directly upon each other (with the subgasket in between 130) as shown in FIG. 1.

Therefore, in FIG. 1, a traditional arrangement is shown wherein a first bipolar plate 114 is formed from elements 156, 158 while the second bipolar plate 116 is formed from elements 156', 158' with a subgasket 130 disposed between the two bipolar plates 114, 116. Where the tunnels in FIG. 1 are reactant tunnels 118, 118', it is understood that reactant tunnels 118, 118' for the first and second bipolar plates respectively are stacked directly on top of each other. However, where the tunnels in FIG. 1 are coolant tunnels 168, 168', the tunnels 168, 168' are also stacked directly on top of each other. It is understood that reactant gases 131, 133 may flow through reactant tunnels 118, 118' when the tunnels are located between the flow field and the manifold inlets/outlets. Accordingly, under this traditional arrangement, the overall length 194 as shown in FIG. 1 may be defined by the distance which spans an anode plate half, a cathode plate half, and a UEA disposed therebetween. The overall length 194 is generally referred to as the cell repeat distance. As a result, the overall length across each fuel cell is dependent on the stacked configuration wherein each coolant tunnel 168 is stacked directly above or below another coolant tunnel 168'.

However, it is desirable in the industry to reduce the overall size of the fuel cell stack while improving the flow capabilities for all three fluids (e.g. $H_2$, $O_2$/air, and coolant) at each bipolar plate.

SUMMARY

The present disclosure provides a fuel cell stack assembly which includes first and second bipolar plates, an active area membrane, and a subgasket. The first bipolar plate defines a first plurality of tunnels and the second bipolar plate defines a second plurality of tunnels. The second plurality of tunnels may be engaged with and nested between the first plurality of tunnels. The active area membrane may be disposed within an internal periphery of a subgasket between the first and second bipolar plates wherein the subgasket may optionally be positioned between the first and second plurality of tunnels. The active area membrane includes a membrane electrode assembly, a first gas diffusion layer disposed adjacent to a first side of the membrane electrode assembly, and a second gas diffusion layer disposed adjacent to a first side of the membrane electrode assembly. The subgasket may optionally define an integrated tab configured to abut one of the first or second bipolar plates. The aforementioned tunnels may be coolant tunnels and/or reactant tunnels depending on the location of the tunnels relative to the manifold inlets/outlets.

Moreover, the present disclosure also provides a fuel cell stack assembly which includes first and second bipolar plates, an active area membrane, and a subgasket. The first bipolar plate defines a first plurality of coolant tunnels and the second bipolar plate defines a second plurality of coolant tunnels. The second plurality of coolant tunnels may be engaged with and nested between the first plurality of coolant tunnels. The active area membrane may be disposed within an internal periphery of a sub gasket between the first and second bipolar plates wherein the subgasket is positioned between the first and second plurality of coolant tunnels. The active area membrane includes a membrane electrode assembly, a first gas diffusion layer disposed adjacent to a first side of the membrane electrode assembly, and a second gas diffusion layer disposed adjacent to a first side of the membrane electrode assembly. The subgasket may optionally define an integrated tab configured to abut one of the first or second bipolar plates.

In any of the aforementioned embodiments of the present disclosure, the subgasket, if included, may or may not be contoured according to a surface of the first bipolar plate and/or second bipolar plate. The contour may be formed prior to assembly or created in a flat region by deformation during the stacking operation. Moreover, each tunnel in the first and second plurality of tunnels defines an upper land having a first end and a second end, a first sidewall integral to the first end, a second sidewall integral to the second end wherein each of the first and second side walls transition to a lower land region, the lower land region being one of a plurality of lower land regions defined in the first and second bipolar plates. Each upper land in the first plurality of tunnels may engage with the lower land region in the second plurality of tunnels which aligns with the upper land in the first plurality of tunnels—with the subgasket disposed therebetween. Similarly, each upper land the second plurality of tunnels may also optionally engage with the lower land region in the first plurality of tunnels which aligns with the upper land in the second plurality of tunnels such that the subgasket is also disposed therebetween.

In yet another optional arrangement, the first and second sidewalls in the first bipolar plate may engage with the first and second sidewalls of the second bipolar plate with the subgasket disposed therebetween.

The present disclosure and its particular features and advantages will become more apparent from the following detailed description considered with reference to the accompanying drawings.

BRIEF DESCRIPTION OF THE DRAWINGS

These and other features and advantages of the present disclosure will be apparent from the following detailed description, best mode, claims, and accompanying drawings in which:

Like reference numerals refer to like parts throughout the description of several views of the drawings.

DETAILED DESCRIPTION

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the lifter body 14 of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

The terms "upper" and "lower" may be used with respect to regions of a single component and are intended to broadly indicate regions relative to each other wherein the "upper" region and "lower" region together form a single component. The terms should not be construed to solely refer to vertical distance/height.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 2A:
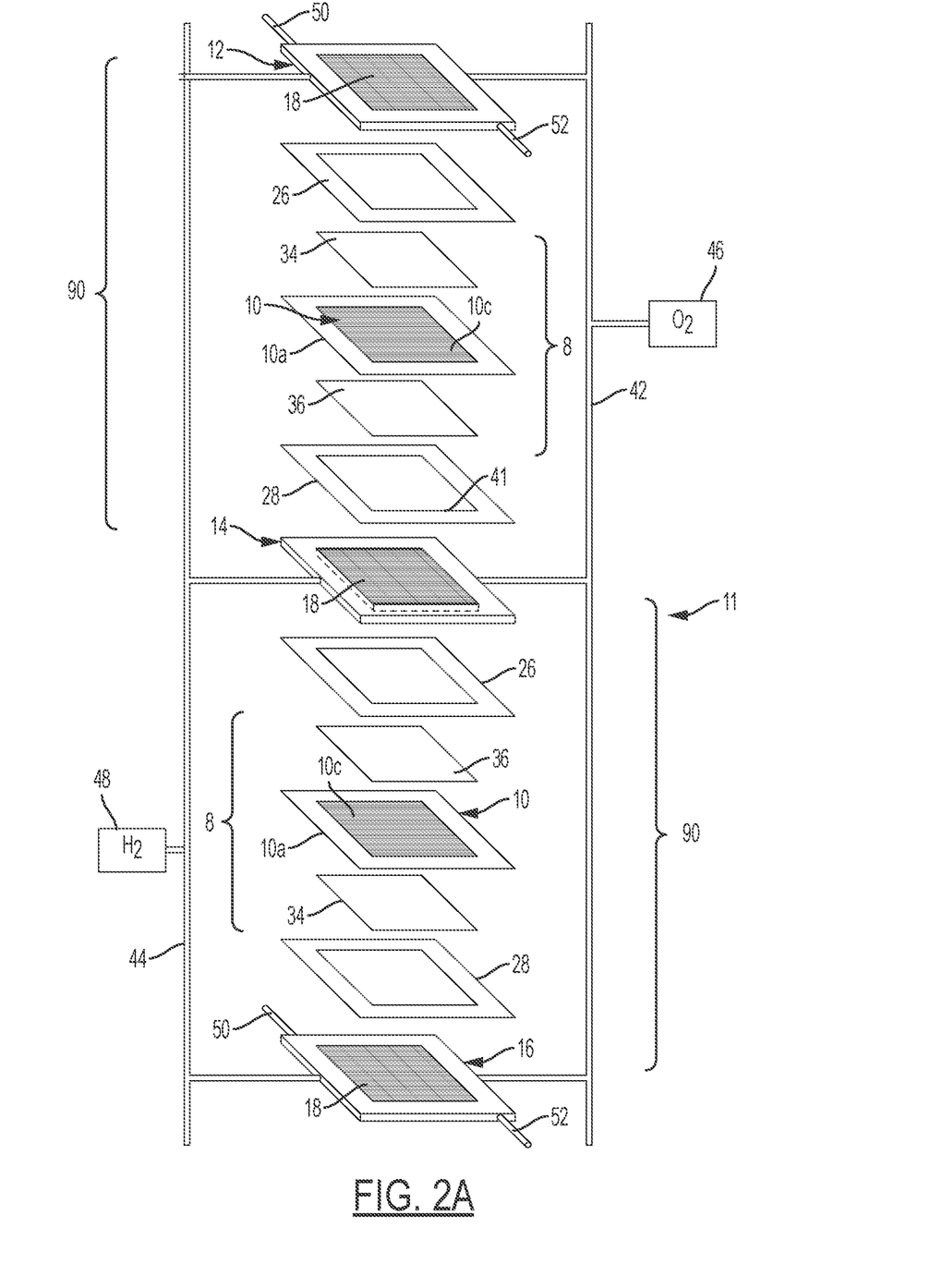
FIG. 2A is an example, expanded non-limiting simplified or schematic view of a fuel cell stack assembly according to the present disclosure.
Figure 2B:
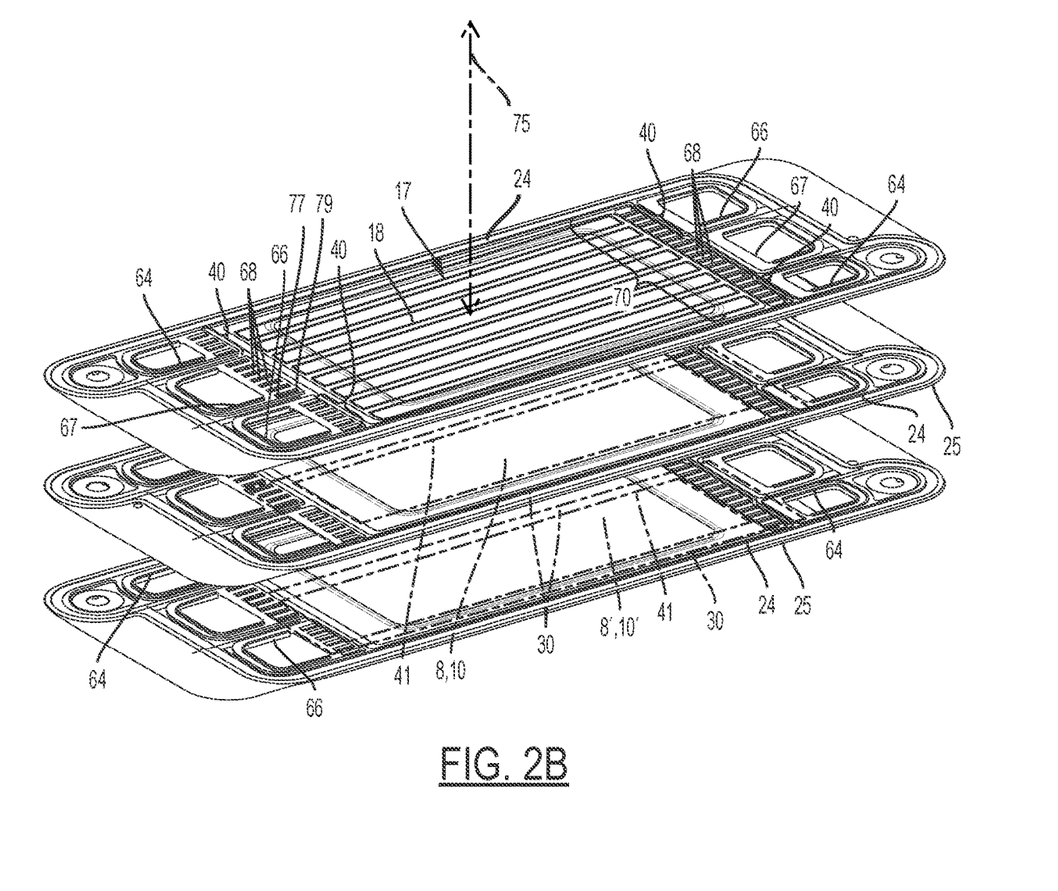
FIG. 2B is an expanded view of a portion of a fuel cell stack assembly according to the present disclosure.

The present disclosure provides for a PEM fuel stack wherein nested tunnels 70 are provided in the region adjacent to an active area region as shown in the non-limiting example of FIG. 2B. FIG. 2A schematically depicts an expanded view of a PEM fuel cell stack 11 having active area membranes 8 separated from each other by a non-porous, electrically-conductive bipolar plates 12. Each active area membrane 8 may be composed of 7 layers: a polymer electrolyte membrane (PEM) 10 having an anode and cathode catalyst layer (10a and 10c respectively) and gas diffusion layers (GDL) 36 on the anode side 10a and a gas diffusion layer 34 on the cathode side 10c. A subgasket 26, 28 may be disposed on each side of the active area membrane 8, or a single subgasket 30 (FIG. 2A) may surround the active area membrane 8. The active area membranes 8 are stacked between non-porous, electrically-conductive, liquid-cooled bipolar plates 12, 14, 16. The bipolar plates 12, 14 and 16 each include nested reactant tunnels 40 (FIG. 2B) formed in the faces of bipolar plates 12, 14, 16 for distributing fuel and oxidant gases (i.e., $H_2$ & $O_2$) to the reactive faces of the active area membranes 8. Similarly, the bipolar plates 12, 14 and 16 each include nested coolant tunnels 68 (FIG. 28) formed in the faces of bipolar plates 12, 14, 16 for distributing coolant to a middle region 17 of each bipolar plate 12, 14, 16. As a result of the nested configuration of all the tunnels 70, the overall length 94 (FIG. 3A) for each fuel cell 90 in the fuel cell stack 11 is decreased thereby providing for a compact, space-efficient fuel cell stack assembly.

Referring back to FIG. 2A, subgaskets 26, 28 provide a seal and electrical insulation between the several bipolar plates 12, 14, 16 of the fuel cell stack 11. Porous, gas permeable, electrically conductive sheets (gas diffusion layers) 34, 36 press up against the electrode faces (an anode and cathode catalyst layer 10a, 10c) of the polymer electrolyte membrane (PEM) 10. The gas diffusion layers 34, 36 serve as primary current collectors for the electrodes. As shown in FIG. 2A, each subgasket(s) 26, 28 defines an internal periphery 41 for the active area membranes 8. Gas diffusion layers 34, 36 also provide mechanical supports for the polymer electrolyte membrane (PEM) and catalyst layers, especially at locations where the polymer electrolyte membrane (PEM) and catalyst layers are otherwise unsupported in the flow field. Suitable gas diffusion layers 34, 36 include carbon/graphite paper/cloth, fine mesh noble metal screens, open cell noble metal foams, and the like which conduct current from the electrodes while allowing gas to pass therethrough.

It is understood that the gas diffusion layer 34, 36 may be a porous structure made by weaving carbon fibers into a carbon cloth (e.g. GDL-CT and ELAT) or by pressing carbon fibers together into a carbon paper (e.g. Sigracet, Freudenberg, and Toray). Many of the standard GDLs that are produced today come with a Micro Porous layer (MPL) and hydrophobic treatment (PTFE). The MPL and PTFE help with the contact to the membrane and with water management. The MPL typically provides a smooth layer with plenty of surface area for catalyst and good contact with the membrane. The MPL often uses PTFE as a binder that increases hydrophobicity, which helps keep the water within the membrane from escaping—drying out the membrane and causing higher resistance (lower performance).

Referring back to FIG. 2A, bipolar plate 14 presses up against the gas diffusion medium 36 on the cathode face 10c of polymer electrolyte membrane (PEM) 10 and gas diffusion medium 36 on the anode face 10a of polymer electrolyte membrane (PEM) 10. Bipolar plate 16 presses up against the gas diffusion medium 34 on the anode face 10a of polymer electrolyte membrane (PEM) 10. Similarly, bipolar plate 12 presses up against the gas diffusion medium 34 on the cathode face 10c of polymer electrolyte membrane (PEM) 10. An oxidant gas (reactant) such as oxygen or air may be supplied to the cathode side of the fuel cell stack from a storage tank 46 via appropriate supply plumbing 42. Similarly, a fuel (reactant) such as hydrogen may be supplied to the anode side of the fuel cell stack from a storage tank 48 via appropriate supply plumbing 44.

In another embodiment, the oxygen tank 46 may be eliminated, and air supplied to the cathode side from the ambient. Likewise, the hydrogen tank 48 may alternatively be eliminated and hydrogen may be supplied to the anode side from a reformer which catalytically generates hydrogen from methanol or a liquid hydrocarbon (e.g., gasoline). Exhaust plumbing (not shown) for both the $H_2$ and $O_2$/air sides of the MEAs may also provide for removing $H_2$-depleted anode gas from the anode flow field and $O_2$-depleted cathode gas from the cathode flow field. Coolant plumbing 50, 52 is provided for supplying and exhausting a liquid coolant flow to the bipolar plates 12, 14, 16 as needed.

Referring now to FIG. 2B, bipolar plates 12, 14, and 16 are shown in an expanded view with the active area membranes 8 and subgaskets 30 shown in phantom. Flow field 18 (FIG. 2B) is also provided in each metal element 56, 56', 56", 58, 58', 58" (FIG. 3A) such that the input reactant gases ($H_2$ 48 and $O_2$ 46 in FIG. 2A) are guided by the flow field 18 so that the input reactant gases move along the surface of the active area membrane 8 for each fuel cell. The flow field 18 is a predetermined flow field pattern 18 which may be in the form of this example, non-limiting list: wiggled pattern, straight pattern or serpentine pattern. The predetermined flow field 18 in each bipolar plate 12, 14, 16 may be adjacent to the face of a gas diffusion layer 34, 36. It is also understood that metal elements 56, 56', 56" may be designed identical to each other while metal elements 58, 58', 58" may also be designed to be identical to each other such that each bipolar plate 12, 14, 16 may be rotated 180 degrees about the axis 75 (see FIG. 2B) along the stacking direction (during the stacking process) to enable the need for only one anode forming tool and one cathode forming tool.

As shown in FIG. 2B, fuel manifold apertures 64 (for Hydrogen) are provided for supply and removal in each bipolar plate. Oxidant manifold apertures 66 (for Oxygen) are also provided for supply and removal. Coolant manifold apertures 67 are also provided for the entry and exit of a coolant fluid flow. The manifold apertures 64, 66 shown in FIG. 2B may be round, rectangular or any shape. Fuel manifold seal areas and oxidant manifold seal areas are at the periphery of the fuel manifold holes 64 and the oxidant manifold holes 66. Coolant tunnels 68 are disposed between the coolant aperture 67 (inlet/outlet) and the flow field 18 (or active area region) so as to guide coolant from the coolant inlet 67 to the flow field 18 and to also guide coolant from the flow field 18 to the coolant outlet 67. Oxidant manifold holes 66 provide oxidant flow only to and from the cathode chamber. Similar to the aforementioned coolant tunnels 68, oxidant/reactant tunnels 40 are disposed in two regions: (1) between the dedicated reactant inlet 66 and flow field 18; and (2) between the flow field 18 and the dedicated reactant outlet 66. Active area membranes 8 for the flow field 18 along with subgasket(s) 30 are shown in phantom in FIG. 2B. Therefore, hydrogen/reactant tunnels 40 are provided to guide hydrogen between the hydrogen inlet/outlet 64 and the flow field 18. In the non-limiting example shown in FIG. 2B, the reactant tunnels 40 are aligned with the reactant apertures—oxidant apertures 66 and hydrogen apertures 64.

Figure 3A:
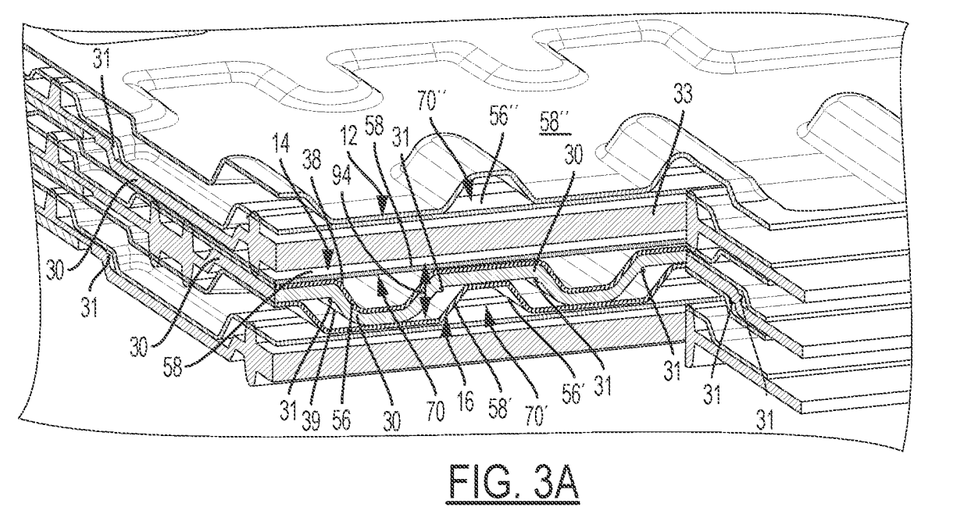
FIG. 3A is a cross-sectional view example, non-limiting nested tunnels (reactant or coolant) according to the present disclosure.

With reference to FIG. 3A, an enlarged, partial, cross-sectional view of the nested tunnels 70 of FIG. 2B in bipolar plates 12, 14, 16 are shown. First and second elements 56, 58 of a non-limiting example first bipolar plate 14 are shown as well as first and second elements 56', 58' of a non-limiting example second bipolar plate 16 are shown. Each first element 56, 56' is attached to the corresponding second element 58, 58' to define the tunnel(s) 70 (shown in FIGS. 2B and 3A-3B). Depending on whether the tunnels 70 are aligned with a reactant inlet/outlet 64, 66 or a coolant inlet/outlet 67, the tunnels may be used to guide one of the reactants (hydrogen or oxygen/air) or the coolant based upon the position of the tunnels 70 relative to each opening 64, 66, 67. First and second elements 56, 58, 56', 58' also define flow field 18 (see FIGS. 2A and 2B) which may, but not necessarily be in the form of serpentine channels which are operatively configured to distribute the reactants over the corresponding active area membrane 8 (shown in FIGS. 2A-2B). In the example shown in FIG. 2B, the flow field 18 is defined in a middle region 17 of each bipolar plate 12, 14, 16 while the tunnels 70 are defined proximate to their corresponding manifold apertures 64, 66, 67.

As shown in FIG. 3A, the first element 56, 56' for each bipolar plate 14, 16 may be disposed proximate to the subgasket 30 wherein bipolar plate 14 is disposed on a first side of subgasket 30 while bipolar plate 16 is disposed on a second side of subgasket 30. At least one of the first or second elements for each bipolar plate 12, 14 is embossed (see example element 56 of bipolar plate 14 and element 56' of bipolar plate 16) such that tunnel(s) 70, 70' (FIG. 3) are defined when the first and second metal elements 56, 58, 56', 58' are joined. Accordingly, the second element 58, 58' is joined with the first element 56, 56' to form a bipolar plate 14, 16 having tunnel(s) 70, 70'. A coolant flow may be provided within the coolant tunnels 68, 68' to reduce the temperature at each fuel cell 90 (see FIG. 2A). Accordingly, each bipolar plate 12, 14, 16 in the fuel cell stack further includes a plurality of tunnels 70, 70', 70" formed therein.

Figure 3B:
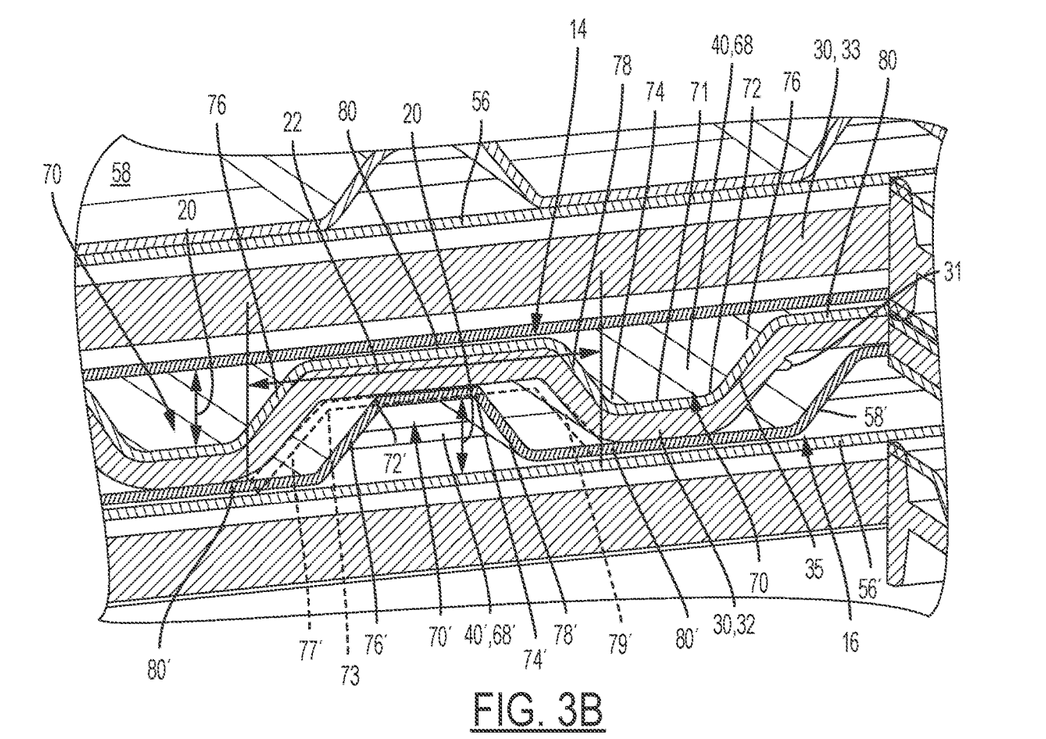
FIG. 3B is an enlarged view of the tunnels in FIG. 3A.

Accordingly, the present disclosure provides a fuel cell stack assembly 11 which includes at least first and second bipolar plates 14, 16, a subgasket 30, and a membrane electrode assembly 8 disposed at least within an internal periphery 41 of the subgasket 30. The first bipolar plate 14 defines a first plurality of coolant tunnels 68. The second bipolar plate 16 defines a second plurality of coolant tunnels 68'. The second plurality of coolant tunnels 68' may be engaged with and nested between the first plurality of coolant tunnels 68 as shown in FIG. 3. A subgasket 30 may optionally be disposed between the first and second bipolar plates 14, 16 in at least the region of the bipolar plates 12, 14, 16 where tunnels 70, 70' are defined.

Referring now to FIG. 3B, each tunnel in the first and second plurality of tunnels 70, 70' defines an upper land 71, 71' having a first end 72, 72' and a second end 74, 74' in addition to a first sidewall 76, 76' integral to the first end 72, 72' and a second sidewall 78, 78' integral to the second end 74, 74'. As shown, each of the first and second side walls 76, 76', 78, 78' transition to a lower land region 80, 80', the lower land region 80, 80' being one of a plurality of lower land regions 80, 80' defined in the first and second bipolar plates 14, 16. In one embodiment, each upper land 71 in the first plurality of tunnels 70 may engage with the lower land region 80' in the second plurality of tunnels with the subgasket 30 disposed therebetween. It is understood that the first and second sidewalls 76, 78 in the first bipolar plate 14 may or may not abut/engage with the first and second sidewalls 76', 78' of the second bipolar plate 16 with the subgasket 30 optionally disposed therebetween. It is also understood that each tunnel 70, 70' in the first and second plurality of tunnels 70, 70' may have a third sidewall 77 and a fourth sidewall 79 as shown in the non-limiting example tunnel in FIG. 2B.

Moreover, each upper land 71' in the second plurality of coolant tunnels 68' may also, but not necessarily, engage with the lower land region 80 in the first plurality of tunnels 70 which aligns with the upper land 71' in the second plurality of coolant tunnels 70'. Similarly, in yet another embodiment, it is understood that the first and second sidewalls 76, 78 in the first bipolar plate 14 may engage with the first and second sidewalls 77', 79' (shown in dashed lines) of the second bipolar plate 16 with the subgasket 30 optionally disposed therebetween. Under this arrangement shown with tunnel 73, the first and second sidewalls 76, 78, 77', 79' abut or engage along the entire length of the sidewall or locally using integral tabs 31 with each other as shown in FIG. 3B. Therefore, the fuel cell stack assembly 11 (see FIG. 1) of the present disclosure provides for a higher flow rate of fluid (reactant or coolant) due to the enlarged size of the tunnels 70, 70' while also decreasing the overall length 94 of each fuel cell. The tunnels 70 of the present disclosure may therefore have a maximized height 20 and may optionally have a maximized width 22 for each tunnel 73. Again, it is understood that the example tunnels 70, 70', 73 may be dedicated for a reactant gas or a coolant depending on the location of the tunnel relative to each manifold aperture 64, 66, 67.

Figure 4:
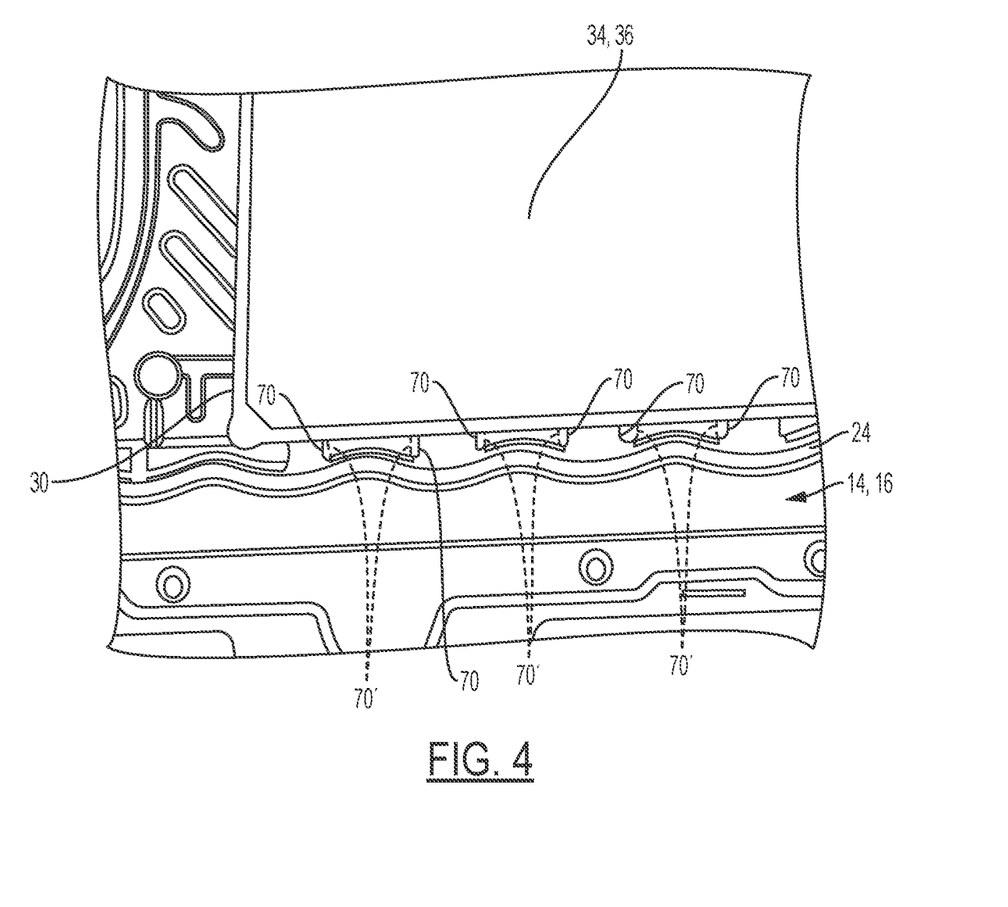
FIG. 4 is a plan view of another non-limiting example of the nested tunnels according to the present disclosure.

Regardless of whether the sidewalls engage with each other as described above, the nested arrangement of tunnels 70, 70' for both the first and second bipolar plates 14, 16 reduces the overall length 94 of each fuel cell (relative to length 194 in FIG. 1) within the fuel cell stack and enables a higher volume of fluid (reactant or coolant) to flow through each enlarged/nested tunnel. It should be noted that while tunnels 70, 70' are shown in FIG. 3B and described in great detail, the tunnel arrangement in FIG. 3B may be reactant tunnels 40 or coolant tunnels 68 depending on their location. Therefore, description regarding the nested and/or engaged arrangement of the first and second plurality of tunnels 70, 70' should be construed to include coolant tunnels 68, 68' or reactant tunnels 18, 18', or both coolant and reactant tunnels (shown as elements 68, 68' and 18, 18' respectively) depending on the location of the tunnels 70 relative to the manifold apertures 64, 66, 67 (see FIG. 2B). It is also understood that the tunnels 70, 70' may have varying length. However, some or each tunnel 70, 70' may be shortened such that the tunnels 70, 70' do not interfere with the gas diffusion layer 34, 36 in the active area region. It is understood that the gas diffusion layers 34, 36 may be sensitive to compressive forces from the first and second bipolar plates 14, 16 and therefore, it may be undesirable to include tunnels 70, 70' which are disposed above or below the gas diffusion layer 34, 36. Therefore, as one alternative to the arrangement of tunnels 70, 70' in FIG. 2B, the first and/or second tunnels 70, 70' may be provided in a substantially perpendicular direction to the metal bead seal 24 as shown in FIG. 4. In these example optional arrangements, the tunnels 70, 70' may be disposed in regions which do not interfere with the gas diffusion layer 34, 36.

Moreover, regardless of how the first and second plurality of tunnels 70, 70' are nested, the subgasket 30 may be defined by a single polymeric member which surrounds the membrane electrode assembly as shown in FIG. 2B or the subgasket 30 may be formed by a first subgasket 26 and a second subgasket 28 which are disposed on opposing sides of the membrane electrode assembly as shown in FIG. 2A. Also, regardless of the configuration of the subgasket 30, the subgasket 30 may also optionally define one or more integrated tabs 31 (FIG. 3A) configured to abut one of the first or second bipolar plates 14, 16 in order to properly position the subgasket 30 within the nested coolant tunnels. Alternative to positioning a subgasket 30 onto one of a first or a second bipolar plate 14, 16 (see subgasket 33 on first bipolar plate 14 in FIG. 3A), the subgasket 30, 32 may be contoured according to an adjacent surface 35 (FIG. 3B) of one of the first or second bipolar plates 14, 16. The contour may be formed prior to assembly or created in a flat region by deformation during the stacking operation. Nonetheless, in this case, the active area membrane 8 is provided in at least within the internal periphery 41 of the molded subgasket 30 during the assembly process.

Referring now to FIG. 4, a plan view of a non-limiting example of the present disclosure is provided where the gas diffusion layer 34, 36 and subgasket 30 is disposed on the corresponding bipolar plate 14, 16 having a wavy metal bead seal 24 with tunnels 70, 70' formed in the corresponding bipolar plate. The tunnels 70, 70' (which may have various configurations) of the bipolar plate 12, 14, 16 may each protrude away from the surface of the bipolar plate 12, 14, 16 such that each tunnel 70, 70' engages with a corresponding lower land region 80, 80' defined between tunnels 70, 70' of the opposing bipolar plate as previously described for FIG. 3B. Accordingly, the tunnels 70, 70' of each first and second bipolar plates 14, 16 in the fuel cell stack engage with and are nested against the tunnels 70, 70' of the adjacent plate.

With respect to all embodiments of the present disclosure, it is understood that nested and/or engaged arrangement between the first plurality of tunnels 70 and the second plurality of tunnels 70' may alternatively be provided in the region of bipolar plate 12, 14, 16 outside of the perimeter of the metal bead seal 24—proximate to the outer edge 25 of the bipolar plate 12, 14, 16.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fuel cell stack assembly comprising:
    a first bipolar plate defining a first plurality of tunnels;
    a second bipolar plate defining a second plurality of tunnels, the second plurality of tunnels being engaged with and nested between the first plurality of tunnels;
    an active area membrane disposed between the first and second bipolar plates and disposed within an internal periphery of a subgasket;
    wherein the subgasket is positioned between the first and second plurality of tunnels; and
    wherein the active area membrane includes a membrane electrode assembly, a first gas diffusion layer disposed adjacent to a first side of the membrane electrode assembly, and a second gas diffusion layer disposed adjacent to a second side of the membrane electrode assembly.

2. The fuel cell stack assembly as defined in claim 1 wherein the subgasket defines an integrated tab configured to abut one of the first or second bipolar plates.

3. The fuel cell stack assembly as defined in claim 1 wherein the subgasket is contoured according to a surface of one of the first or second bipolar plates.

4. The fuel cell stack assembly as defined in claim 1 wherein each of the tunnels in the first and second plurality of tunnels defines an upper land having a first end and a second end, a first sidewall integral to the first end, a second sidewall integral to the second end wherein each of the first and second sidewalls transition to a lower land region, the lower land region being one of a plurality of lower land regions defined in the first and second bipolar plates.

5. The fuel cell stack assembly as defined in claim 2 wherein the subgasket is contoured according to a surface of one of the first or second bipolar plates.

6. The fuel cell stack assembly as defined in claim 4 wherein the upper land in each of the first plurality of tunnels engages with the lower land region in the second plurality of tunnels which aligns with the upper land in the first plurality of tunnels with the subgasket disposed therebetween.

7. The fuel cell stack assembly as defined in claim 6 wherein the upper land in each of the second plurality of tunnels engages with the lower land region in the first plurality of tunnels.

8. The fuel cell stack assembly as defined in claim 4 wherein the first and second sidewalls in the first bipolar plate engage with the first and second sidewalls of the second bipolar plate with the subgasket disposed therebetween.

9. The fuel cell stack assembly as defined in claim 6 wherein the first and second sidewalls in the first bipolar plate engage with the first and second sidewalls of the second bipolar plate with the subgasket disposed therebetween.

10. The fuel cell stack assembly as defined in claim 7 wherein the first and second sidewalls in the first bipolar plate engage with the first and second sidewalls of the second bipolar plate with the subgasket disposed therebetween.

11. A fuel cell stack assembly comprising:
    a first bipolar plate defining a first plurality of coolant and or reactant tunnels;
    a second bipolar plate defining a second plurality of coolant and or reactant tunnels, the second plurality of coolant and or reactant tunnels being engaged with and nested between the first plurality of coolant and or reactant tunnels;
    an active area membrane disposed between the first and second bipolar plates; and
    wherein the active area membrane includes a membrane electrode assembly and a first gas diffusion layer disposed adjacent to a first side of the membrane electrode assembly.

12. The fuel cell stack assembly as defined in claim 11 wherein the first and second plurality of coolant and or reactant tunnels each defines an upper land having a first end and a second end, a first sidewall integral to the first end, a second sidewall integral to the second end wherein each of the first and second sidewalls transition to a lower land region, the lower land region being one of a plurality of lower land regions defined in the first and second bipolar plates.

13. The fuel cell stack assembly as defined in claim 12 wherein the upper land in each of the first plurality of coolant and or reactant tunnels engages with the lower land region in the second plurality of coolant and or reactant tunnels which aligns with the upper land in the first plurality of coolant and or reactant tunnels, and wherein a subgasket is disposed between the respective upper land and the respective lower land region.

14. The fuel cell stack assembly as defined in claim 13 wherein the upper land in each of the second plurality of coolant and or reactant tunnels engages with the lower land region in the first plurality of coolant and or reactant tunnels which aligns with the upper land in the second plurality of coolant and or reactant tunnels.

15. The fuel cell stack assembly as defined in claim 13 wherein the first and second sidewalls in the first bipolar plate engage with the first and second sidewalls of the second bipolar plate with the subgasket disposed therebetween.

16. The fuel cell stack assembly as defined in claim 15 wherein the active area membrane includes a second gas diffusion layer disposed adjacent to a second side of the membrane electrode assembly.

* * * * *